United States Patent
Chen et al.

(10) Patent No.: US 9,608,434 B2
(45) Date of Patent: Mar. 28, 2017

(54) INVERTER APPARATUS HAVING PRIMARY-SIDE AND SECONDARY-SIDE DRIVER CIRCUITS DRIVEN BY RESPECTIVE DC/DC CONVERTERS AND CONTROL METHOD THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 145 days.

(21) Appl. No.: 14/630,605

(22) Filed: Feb. 24, 2015

(65) Prior Publication Data
US 2015/0244166 A1    Aug. 27, 2015

Related U.S. Application Data

(60) Provisional application No. 61/944,587, filed on Feb. 26, 2014.

(30) Foreign Application Priority Data

Jan. 30, 2015  (TW) .............................. 104103278 A

(51) Int. Cl.
*H02M 1/36* (2007.01)
*H02H 7/12* (2006.01)
(Continued)

(52) U.S. Cl.
CPC .......... *H02H 7/1213* (2013.01); *H02H 3/202* (2013.01); *H02J 5/00* (2013.01); *H02M 1/32* (2013.01); *H02M 3/24* (2013.01); *H02M 7/44* (2013.01); *H02M 7/48* (2013.01); *H02M 1/36* (2013.01); *H02M 2001/007* (2013.01)

(58) Field of Classification Search
CPC ............ H02M 1/36; H02M 1/44; H02M 7/48; H02M 7/537; H02M 2001/0022; H02M 2001/0032; H02M 2001/0058; H02M 2001/007
See application file for complete search history.

(56) References Cited

U.S. PATENT DOCUMENTS

| | | | | |
|---|---|---|---|---|
| 6,166,932 A | * | 12/2000 | Otoshi | ................ H02M 7/4807 363/25 |
| 7,529,106 B2 | * | 5/2009 | Hikosaka | .......... H02M 3/33592 363/17 |
| 2011/0249475 A1 | * | 10/2011 | Fujii | ...................... H02H 7/122 363/50 |

* cited by examiner

*Primary Examiner* — Matthew Nguyen
(74) *Attorney, Agent, or Firm* — Winston Hsu; Scott Margo

(57) ABSTRACT

An inverter apparatus includes a direct current to direct current converter (DC/DC converter), a direct current to alternating current converter (DC/AC converter), a primary-side control circuit and a secondary-side control circuit. The DC/DC converter is arranged for outputting a first DC power and a second DC power. The DC/AC converter is coupled to the DC/DC converter, and is arranged for receiving the first DC power. The primary-side control circuit is coupled to the DC/DC converter, and is arranged for controlling an operation of the DC/DC converter. The secondary-side control circuit is coupled to the DC/DC converter and the DC/AC converter, and is arranged for receiving the second DC power, and controlling an operation of the DC/AC converter according to the second DC power.

12 Claims, 6 Drawing Sheets

(51) Int. Cl.
*H02M 3/24* (2006.01)
*H02M 7/44* (2006.01)
*H02M 1/32* (2007.01)
*H02M 7/48* (2007.01)
*H02H 3/20* (2006.01)
*H02J 5/00* (2016.01)
*H02M 1/00* (2006.01)

INVERTER APPARATUS HAVING PRIMARY-SIDE AND SECONDARY-SIDE DRIVER CIRCUITS DRIVEN BY RESPECTIVE DC/DC CONVERTERS AND CONTROL METHOD THEREOF

CROSS REFERENCE TO RELATED APPLICATIONS

This application claims the benefit of U.S. provisional application No. 61/944,587, filed on Feb. 26, 2014, the contents of which are incorporated herein by reference.

BACKGROUND OF THE INVENTION

1. Field of the Invention

The disclosed embodiments of the present invention relate to an inverter apparatus, and more particularly, to an inverter apparatus having a primary-side driver circuit and a secondary-side driver circuit driven by respective direct current to direct current (DC/DC) converters, and a related control method.

2. Description of the Prior Art

A conventional inverter apparatus uses a fly-back direct current to direct current (DC/DC) converter as an auxiliary power source shared by a primary-side driver circuit and a secondary-side driver circuit, wherein the primary-side driver circuit drives a DC/DC converter, and the secondary-side driver circuit drives a direct current to alternating current (DC/AC) converter. However, due to poor conversion efficiency (e.g. a large energy loss in a transformer), the fly-back DC/DC converter cannot provide a high efficiency auxiliary power source for the conventional inverter apparatus.

Thus, a novel inverter apparatus is needed to solve the problem of low performance of a conventional inverter apparatus due to poor conversion efficiency of a fly-back DC/DC converter.

SUMMARY OF THE INVENTION

It is therefore one objective of the present invention to provide an inverter apparatus having a primary-side driver circuit and a secondary-side driver circuit driven by respective DC/DC converters, and a related control method to solve the above problems.

It is therefore another objective of the present invention to provide overvoltage protection mechanism to effectively prevent an overvoltage condition from occurring on a DC bus of the inverter apparatus during an initial start-up period.

According to an embodiment of the present invention, an exemplary inverter apparatus is disclosed. The exemplary inverter apparatus comprises a DC/DC converter, a DC/AC converter, a primary-side control circuit and a secondary-side control circuit. The DC/DC converter is arranged for outputting a first DC power and a second DC power. The DC/AC converter is coupled to the DC/DC converter, and is arranged for receiving the first DC power. The primary-side control circuit is coupled to the DC/DC converter, and is arranged for controlling an operation of the DC/DC converter. The secondary-side control circuit is coupled to the DC/DC converter and the DC/AC converter, and is arranged for receiving the second DC power, and controlling an operation of the DC/AC converter according to the second DC power.

In one implementation, the exemplary inverter apparatus further comprises a guard circuit. The guard circuit is coupled to the DC/DC converter, and is arranged for detecting the first DC power and accordingly generating a protection signal to the primary-side control circuit. The primary-side control circuit further refers to the protection signal to control the operation of the DC/DC converter.

According to an embodiment of the present invention, an exemplary control method of an inverter apparatus is disclosed. The inverter apparatus comprises a DC/DC converter and a DC/AC converter. An output side of the DC/DC converter is coupled to an input side of the DC/AC converter. The exemplary control method comprises the following steps: outputting a first DC power and a second DC power from the output side of the DC/DC converter, wherein the first DC power is outputted to the input side of the DC/AC converter; and receiving the second DC power, and controlling an operation of the DC/AC converter according to the second DC power.

In one implementation, the exemplary control method further comprises: detecting the first DC power, and accordingly generating a protection signal; and controlling an operation of the DC/DC converter according to the protection signal.

The proposed inverter apparatus and control method thereof may not only provide a high efficiency auxiliary power source for a primary-side/a secondary-side circuit, but also provide overvoltage protection mechanism to prevent an overvoltage condition from occurring on a DC bus during an initial start-up period. Hence, the proposed inverter apparatus and control method thereof can be used in a variety of power conversion schemes.

These and other objectives of the present invention will no doubt become obvious to those of ordinary skill in the art after reading the following detailed description of the preferred embodiment that is illustrated in the various figures and drawings.

DETAILED DESCRIPTION

The proposed inverter apparatus includes a primary-side auxiliary power source and a secondary-side auxiliary power source which are disposed separately from each other, and provide overvoltage protection mechanism to avoid an overvoltage condition between a primary side and a secondary side of the inverter apparatus, thereby replacing a conventional inverter architecture where the primary side and the secondary side share an auxiliary power source implemented by a fly-back DC/DC converter. To facilitating an understanding of the present invention, the proposed inverter apparatus is implemented by a photovoltaic inverter in the following. However, the proposed inverter apparatus and related control method are not limited to be employed in a photovoltaic inverter. Further description is provided below.

Figure 1:
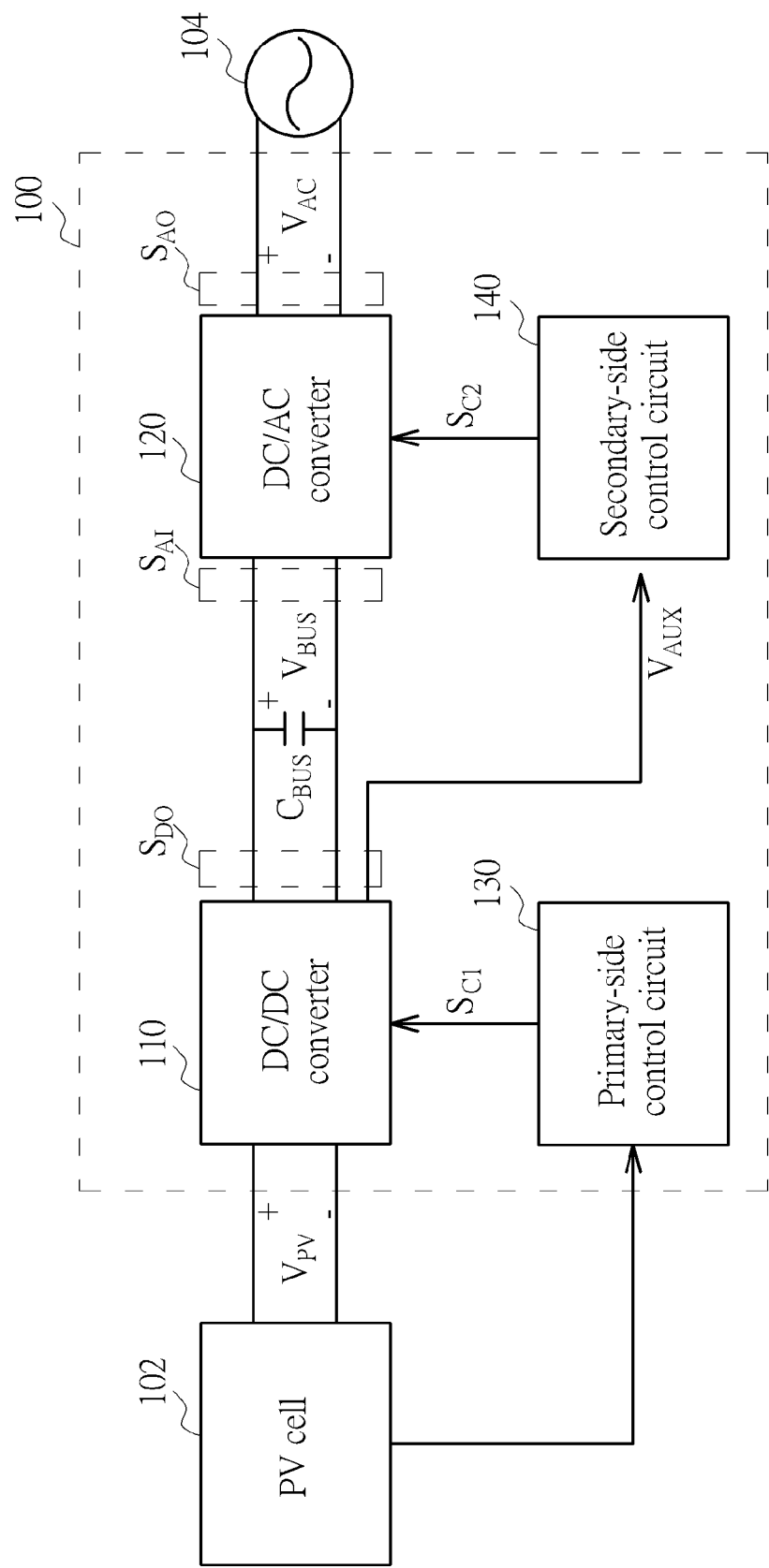
FIG. 1 is a block diagram illustrating an exemplary inverter apparatus according to an embodiment of the present invention.

Please refer to FIG. 1, which is a block diagram illustrating an exemplary inverter apparatus according to an embodiment of the present invention. The inverter apparatus 100 is coupled between a photovoltaic cell (PV cell) 102 and a grid 104, and may include, but is not limited to, a DC/DC converter 110, a DC/AC converter 120, a primary-side control circuit 130 and a secondary-side control circuit 140. The DC/DC converter 110 may receive an input power $V_{PV}$ provided by the PV cell 102, and accordingly output a DC power $V_{BUS}$ (e.g. a DC bus voltage; a voltage drop across a DC bus capacitor $C_{BUS}$) and a DC power $V_{AUX}$ from an output side $S_{DO}$. The output side $S_{DO}$ of the DC/DC converter 110 is coupled to an input side $S_{AI}$ of the DC/AC converter 120, wherein the DC/AC converter 120 may receive the DC power $V_{BUS}$ from the input side $S_{AI}$, and convert the DC power $V_{BUS}$ to generate an AC power $V_{AC}$ to an output side $S_{AC}$. The primary-side control circuit 130 is coupled to the DC/DC converter 110, and is arranged for generate a control signal $S_{C1}$ to control an operation of the DC/DC converter 110, wherein a required power of the primary-side control circuit 130 may be supplied by the PV cell 102. The secondary-side control circuit 140 is coupled to the DC/DC converter 110 and the DC/AC converter 120. The secondary-side control circuit 140 is arranged for receiving the DC power $V_{AUX}$, and generating a control signal $S_{C2}$ according to the DC power $V_{AUX}$ to thereby control an operation of the DC/AC converter 130.

Figure 2:
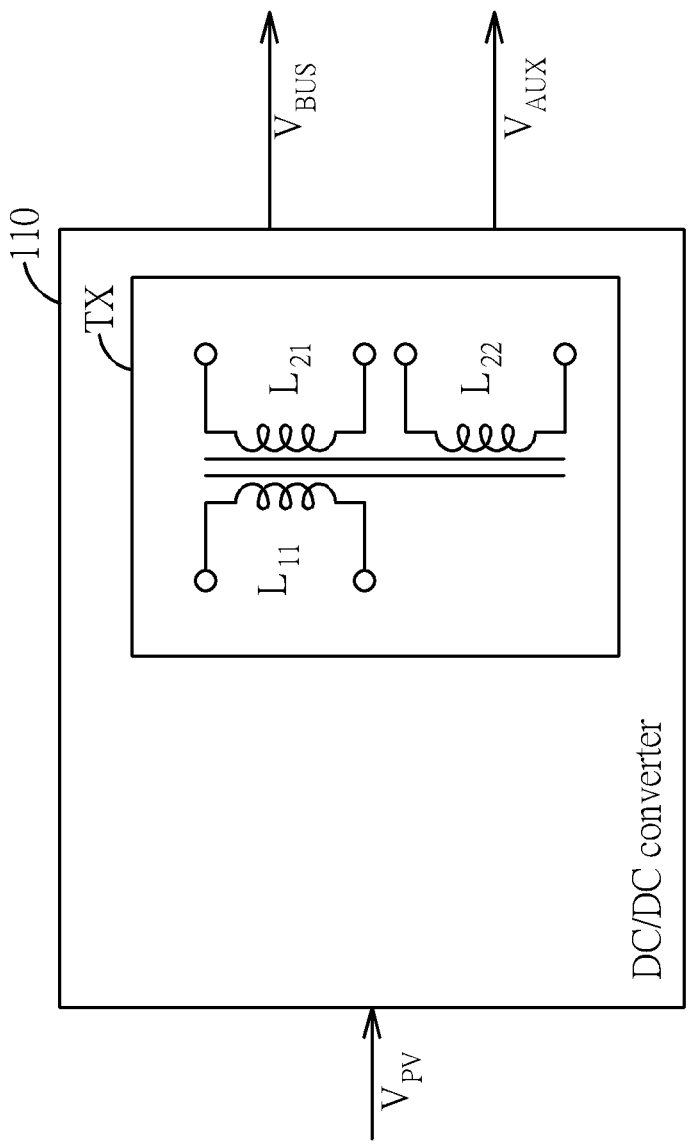
FIG. 2 is a diagram illustrating a part of circuit elements of the DC/DC converter shown in FIG. 1 according to an embodiment of the present invention.

By way of example but not limitation, the DC/DC converter 110 may be implemented by an LLC resonant converter, which may provide soft switching to increase conversion efficiency and reduce electromagnetic interference (EMI). The DC/AC converter 120 may be referred to as a DC/AC inverter. Additionally, in one implementation, the DC/DC converter 110 may use a transformer included therein to provide the DC power $V_{BUS}$ and the DC power $V_{AUX}$. Please refer to FIG. 2, which is a diagram illustrating a part of circuit elements of the DC/DC converter 110 shown in FIG. 1 according to an embodiment of the present invention. In this embodiment, the DC/DC converter 110 may include a transformer TX, which may have a primary side and a secondary side. The primary side of the transformer TX may include a winding $L_{11}$, and the secondary side of the transformer TX may include a plurality of windings $L_{21}$ and $L_{22}$. The transformer TX may perform voltage conversion on an electrical power received at the primary side (e.g. the input power $V_{PV}$), and accordingly output the DC powers $V_{BUS}$ and $V_{AUX}$ from the windings $L_{21}$ and $L_{22}$ of the secondary side, respectively.

Please note that the generation of the DC powers $V_{BUS}$ and $V_{AUX}$ described above is for illustrative purposes only, and is not meant to be a limitation of the present invention. For example, the DC/DC converter 110 may use a voltage divider circuit to generate a divided voltage of the DC power $V_{BUS}$ as the DC power $V_{AUX}$. As long as the DC/DC converter 110 may convert the input power $V_{PV}$ to generate the DC powers $V_{BUS}$ and $V_{AUX}$ to the output side $S_{DO}$, other modifications and alternatives fall within the scope of the present invention.

Figure 3:
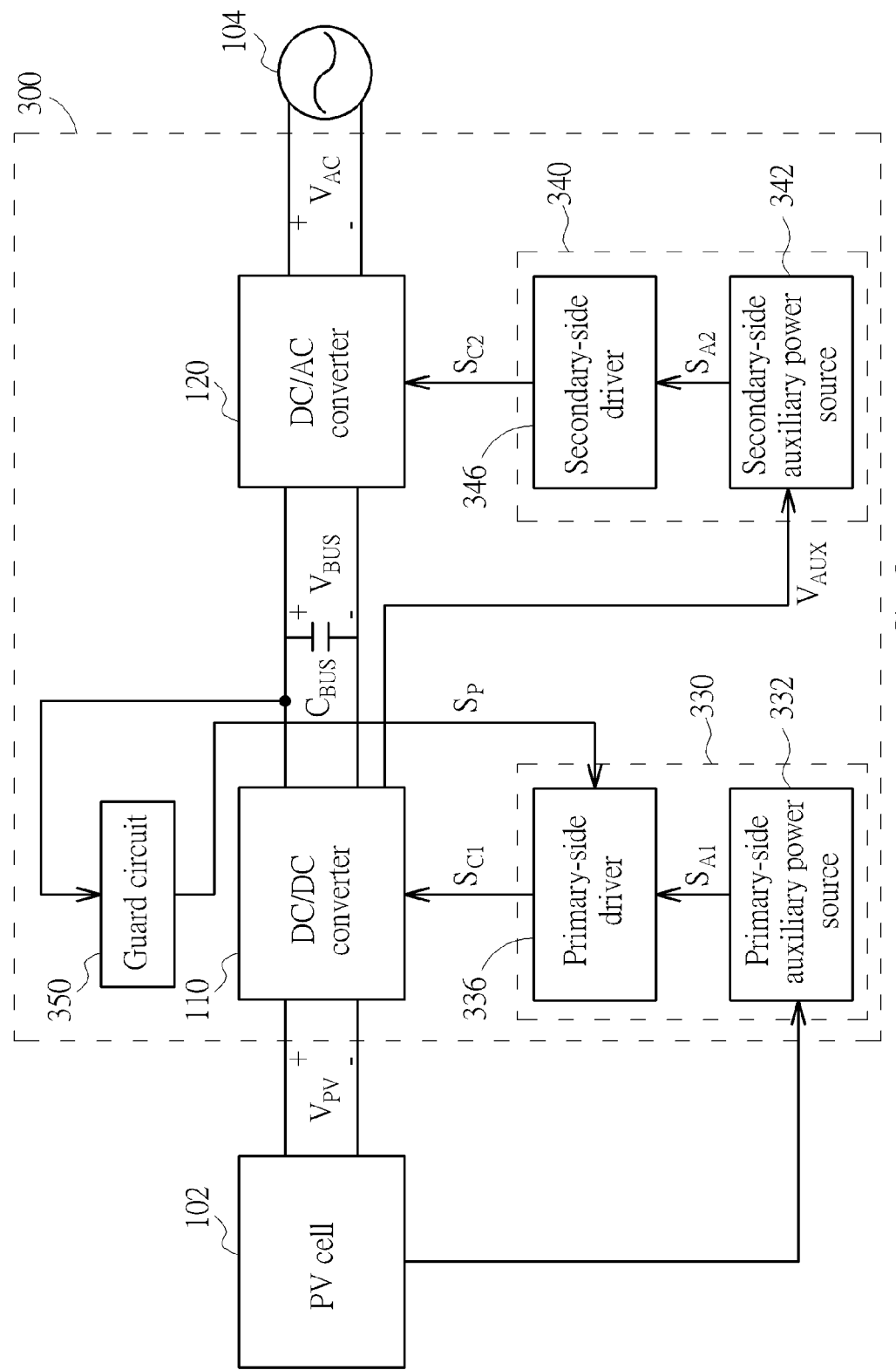
FIG. 3 is an implementation of the inverter apparatus shown in FIG. 1.

In practice, the primary-side control circuit 130/the secondary-side control circuit 140 may include a DC/DC converter which is used as a primary-side/secondary-side auxiliary power source, wherein the DC/DC converter may be implemented by a high-efficiency buck converter rather than a flyback converter. Please refer to FIG. 3, which is an implementation of the inverter apparatus 100 shown in FIG. 1. The inverter apparatus 300 may include the DC/DC converter 110 and the DC/AC converter 120 shown in FIG. 1, a primary-side control circuit 330 and a secondary-side control circuit 340, wherein the primary-side control circuit 130 and the secondary-side control circuit 140 shown in FIG. 1 may be implemented by the primary-side control circuit 330 and the secondary-side control circuit 340 respectively.

The primary-side control circuit 330 may include a primary-side auxiliary power source 332 and a primary-side driver circuit 336, and the secondary-side control circuit 340 may include a secondary-side auxiliary power source 342 and a secondary-side driver circuit 346. The primary-side auxiliary power source 332 may provide a primary-side auxiliary power signal $S_{A1}$ to the primary-side driver circuit 336, wherein a required power of the primary-side auxiliary power source 332 may be supplied by the PV cell 102. The primary-side driver circuit 336 is coupled between the primary-side auxiliary power source 332 and the DC/DC converter 110, and drives the DC/DC converter 110 according to at least the primary-side auxiliary power signal $S_{A1}$. The secondary-side auxiliary power source 342 may receive the DC power $V_{AUX}$ to generate a secondary-side auxiliary power signal $S_{A2}$. The secondary-side driver circuit 346 is coupled between the secondary-side auxiliary power source 342 and the DC/AC converter 120, and is arranged for driving the DC/AC converter 120 according to the secondary-side auxiliary power signal $S_{A2}$. In this implementation, at least one of the primary-side auxiliary power source 332 and the secondary-side auxiliary power source 342 may be implemented by a high efficiency DC/DC converter (e.g. a buck converter) instead of a flyback power converter.

It should be noted that the proposed inverter apparatus may further provide protection mechanism to prevent an overvoltage condition from occurring in a secondary-side circuit. For example, in the embodiment shown in FIG. 3, during an initial start-up period of the inverter apparatus 300, the primary-side auxiliary power source 332 may activate the primary-side driver circuit 336 according to an electrical power supplied by the PV cell 102. Hence, the primary-side driver circuit 336 may enable the DC/DC converter 110 to convert the input power $V_{PV}$, thereby gradually increasing an energy level (e.g. a voltage level) of the DC power $V_{BUS}/V_{AUX}$. As the frequency and amplitude detection of the grid 104 takes a period of time, it may occur that the energy level of the DC power $V_{BUS}$ is greater than a predetermined level while the secondary-side driver circuit 346 remains turned off. In other words, during the initial start-up period of the inverter apparatus 300 (the frequency and amplitude detection of the grid 104 has not yet been completed), the secondary-side driver circuit 346 may be unable to drive the DC/AC converter 120 to control the DC power $V_{BUS}$ (a DC bus voltage). This may cause an overvoltage condition on the DC power $V_{BUS}$.

In order to avoid the overvoltage condition which may damage the internal circuitry of the inverter apparatus 300, the inverter apparatus 300 may further include a guard circuit 350, which is coupled to the DC/DC converter 110 and is arranged for detecting the DC power $V_{BUS}$ and accordingly generating a protection signal $S_P$ to the primary-side control circuit 330. Hence, the primary-side control circuit 330 may control the operation of the DC/DC converter 110 according to the electrical power supplied by the PV cell 102 and the protection signal $S_P$. For example, the guard circuit 350 may compare the energy level of the DC power $V_{BUS}$ with a predetermined level, and accordingly generate the protection signal $S_P$ to control the operation of the DC/DC converter 110. In one implementation, when the guard circuit 350 detects that the energy level of the DC power $V_{BUS}$ is greater than the predetermined level, the primary-side control circuit 330 may turn off the DC/DC converter 110 according to the protection signal $S_P$ so as to protect the circuit elements on the secondary side of the inverter apparatus 300. In another implementation, when the guard circuit 350 detects that the energy level of the DC power $V_{BUS}$ is less than the predetermined level, the primary-side control circuit 330 may turn on the DC/DC converter 110 according to the protection signal $S_P$. In the embodiment shown in FIG. 3, the protection signal $S_P$ generated by the guard circuit 350 may be received by the primary-side driver circuit 336, and the primary-side driver circuit 336 may drive the DC/DC converter 110 according to the primary-side auxiliary power signal $S_{A1}$ and the protection signal $S_P$.

In a case where the guard circuit 350 detects a voltage level of the DC power $V_{BUS}$ to generate the protection signal $S_P$, the guard circuit 350 may be implemented with an overvoltage protection structure. Please refer to FIG. 4, which is an implementation of the guard circuit 350 shown in FIG. 3. In this implementation, the guard circuit 350 may include an overvoltage protection circuit 452 and a controller 456. The overvoltage protection circuit 452 may compare the voltage level of the DC power $V_{BUS}$ with a predetermined level $V_{REF}$ to generate a comparison result DR. The controller 456 is coupled to the overvoltage protection circuit 452, and is arranged for generating the protection signal $S_P$ according to the comparison result DR. By way of example but not limitation, a detection circuit 455 may compare a voltage $V_D$ generated by a voltage divider circuit 453 with the predetermined level $V_{REF}$ to generate a detection result, and an optical coupler circuit 454 may generate the comparison result DR according to the detection result. When the voltage $V_D$ is too high (i.e. the voltage level of the DC power $V_{BUS}$ is too high), the optical coupler circuit 454 may couple a voltage $V_M$ to ground (i.e. a resistor $R_3$ is grounded). Hence, the controller 456 may generate the protection signal $S_P$ according to the comparison result DR (the voltage $V_M$), thereby instructing the primary-side control circuit 330 shown in FIG. 3 to turn off the DC/DC converter 110.

Figure 4:
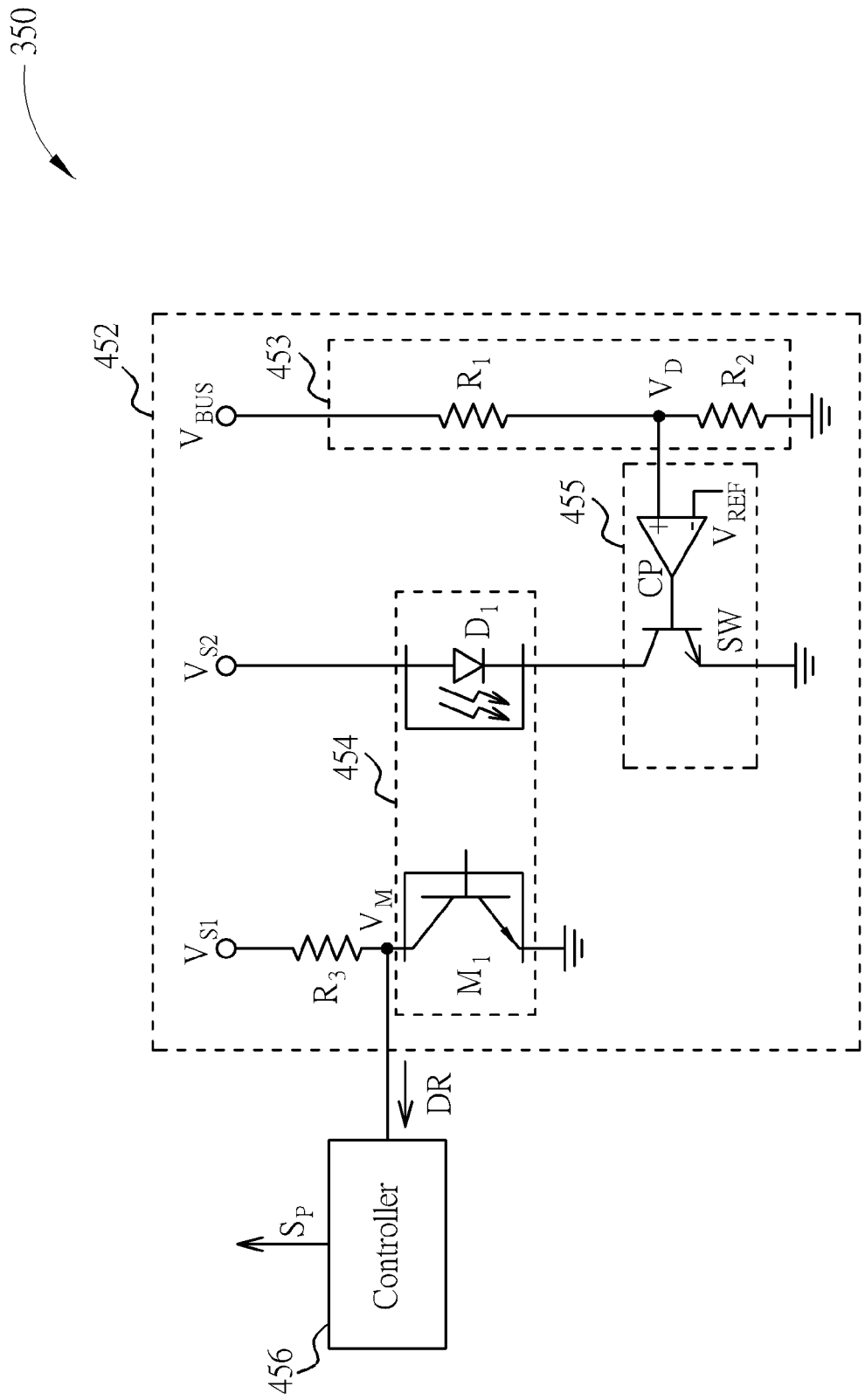
FIG. 4 is an implementation of the guard circuit shown in FIG. 3.

In the embodiment shown in FIG. 4, the voltage divider circuit 453 may be implemented by a resistor $R_1$ and a resistor $R_2$, the detection circuit 455 may be implemented by a comparator CP and a switch SW, and the optical coupler circuit 454 may be implemented by a photodiode $D_1$ and a transistor $M_1$. Voltages $V_{S1}$ and $V_{S2}$ may be used as required powers of the transistor $M_1$ and the photodiode $D_1$ respectively. The comparator CP may compare the voltage $V_D$ with the predetermined level $V_{REF}$. When the voltage $V_D$ is greater than the predetermined level $V_{REF}$ (e.g. 2.5 volts), meaning that the voltage level of the DC power $V_{BUS}$ is too high, the switch SW turns on, and the photodiode $D_1$ turns on accordingly. Hence, the transistor $M_1$ turns on to couple the voltage $V_M$ to ground.

Figure 5:
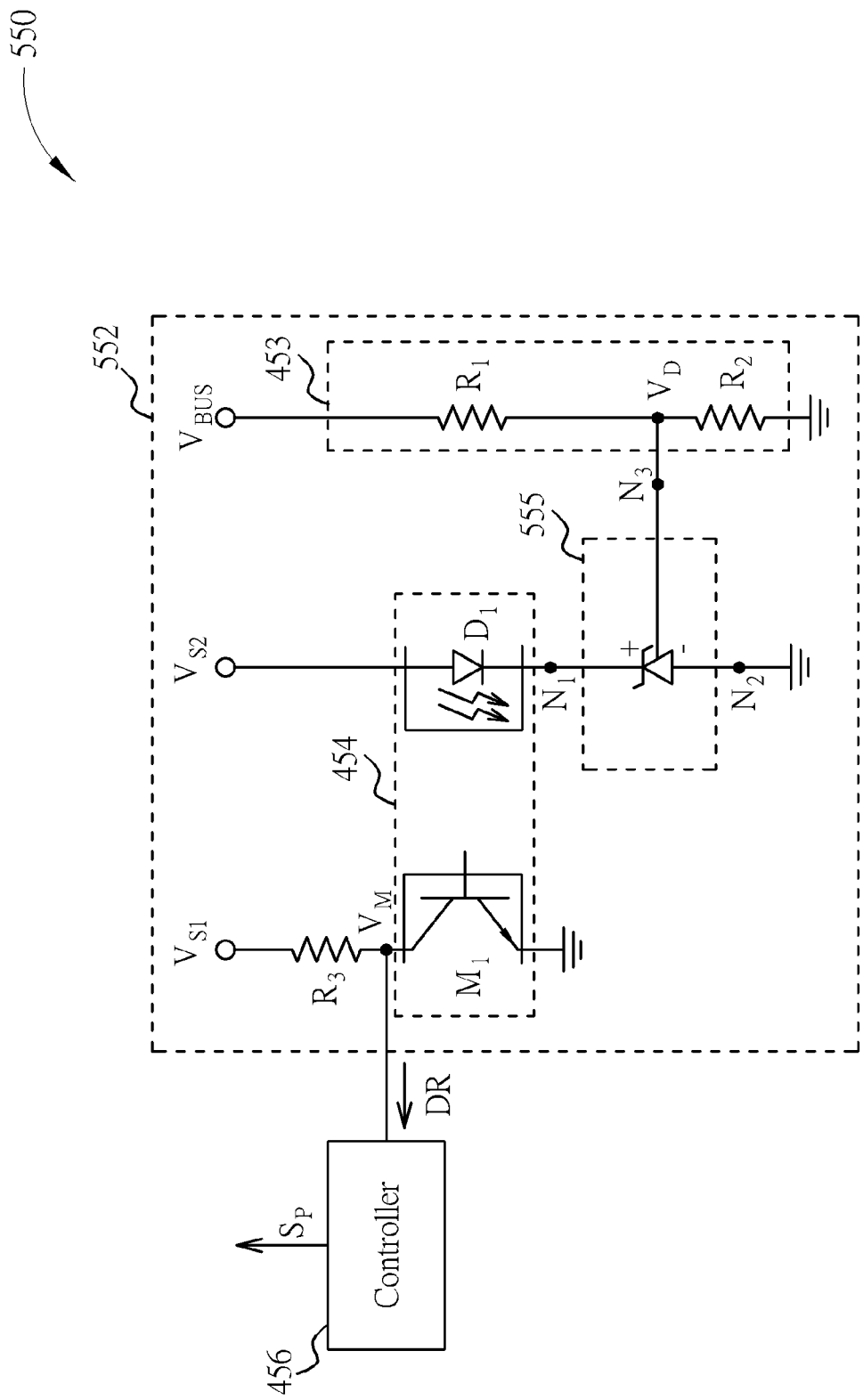
FIG. 5 is another implementation of the guard circuit shown in FIG. 3.
Figure 6:
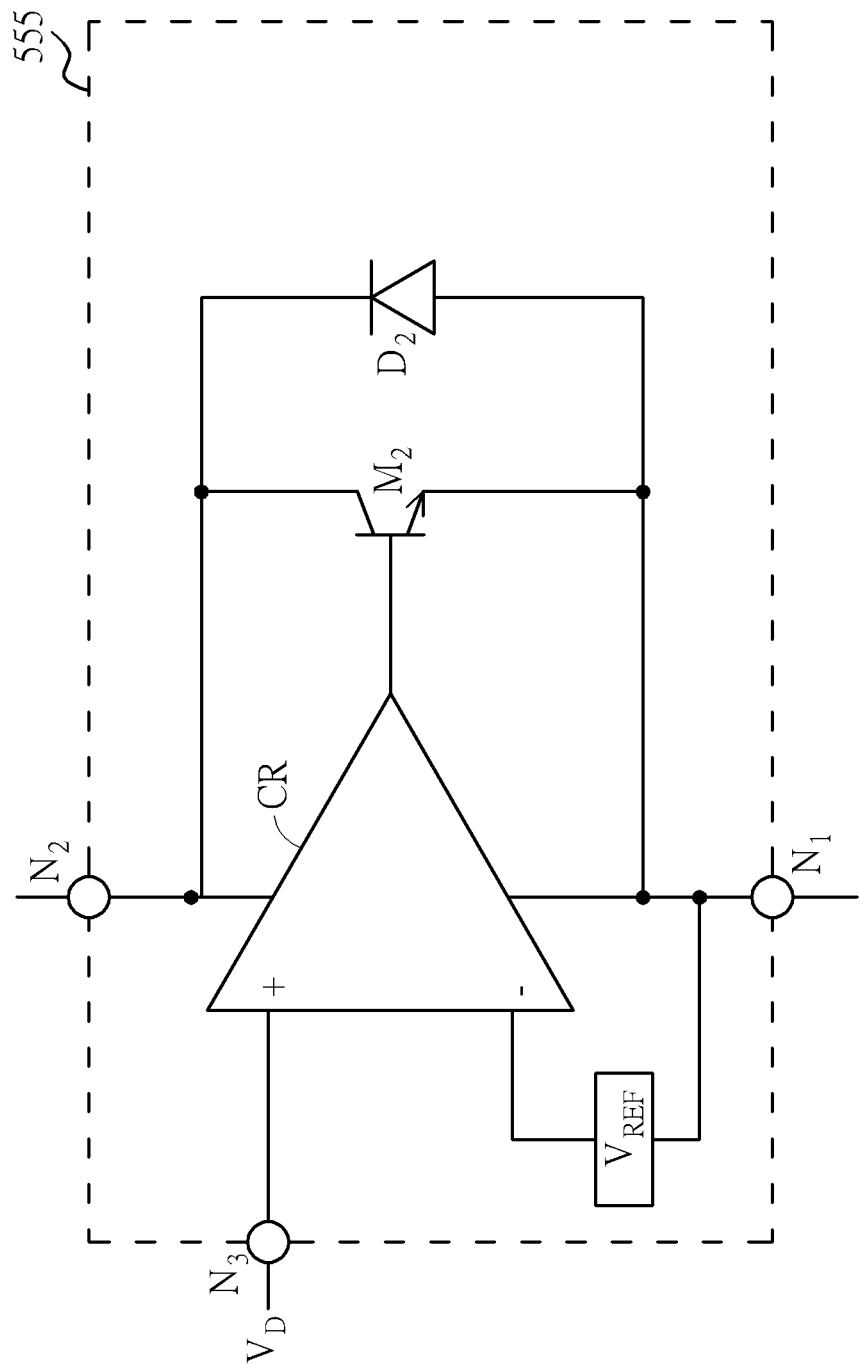
FIG. 6 is a circuit diagram of the detection circuit shown in FIG. 5.

The circuit structure of the guard circuit 350 shown in FIG. 4 is for illustrative purposes only, and is not meant to be a limitation of the present invention. For example, at least one of the voltage divider circuit 453, the optical coupler circuit 454 and the detection circuit 455 may be implemented by other circuit topologies. Please refer to FIG. 5, which is another implementation of the guard circuit 350 shown in FIG. 3. In this alternative design, the architecture of the guard circuit 550 is based on that of the guard circuit 350 shown in FIG. 4, wherein the main difference is that a detection circuit 555 included in an overvoltage protection circuit 552 may be implemented by a three-terminal adjustable precision shunt regulator (AS431). A plurality of connection terminals $N_1$-$N_3$ may be coupled to the optical coupler circuit 454, ground and the voltage $V_D$ respectively, wherein the details of the detection circuit 555 are shown in FIG. 6. Please note that the three-terminal adjustable precision shunt regulator is merely one example of the proposed detection circuit and is not intended to suggest any limitation as to the scope of use or functionality of the invention. Additionally, as a person skilled in the art should understand that the operations associated with the comparator CR, the transistor $M_2$, the diode $D_2$ and the predetermined level $V_{REF}$ shown in FIG. 6, further description is omitted here for brevity.

In the embodiment shown in FIG. 4, the overvoltage protection circuit 452 uses the voltage divider circuit 453 (implemented by the resistors $R_1$ and $R_2$), the optical coupler circuit 454 (implemented by the photodiode $D_1$ and the transistor $M_1$, whose voltage source is the voltage $V_{S1}$) and the detection circuit 455 (implemented by the comparator CP and the switch SW) to detect the DC power $V_{BUS}$. However, this is for illustrative purposes only, and is not meant to be a limitation of the present invention. In an alternative design, at least one of the voltage divider circuit 453, the optical coupler circuit 454 and the detection circuit 455 may be implemented by other circuit topologies. In another alternative design, it is possible to directly use a comparison circuit to compare the voltage level of the DC power $V_{BUS}$ with the predetermined level $V_{REF}$ to generate the comparison result DR. Further, the overvoltage protection mechanism shown in FIG. 3/FIG. 4/FIG. 5 may be employed in the inverter apparatus 100 shown in FIG. 1.

To sum up, the proposed inverter apparatus and control method thereof may not only provide a high efficiency auxiliary power source for a primary-side/a secondary-side circuit, but also provide overvoltage protection mechanism to prevent an overvoltage condition from occurring on a DC bus during an initial start-up period. Hence, the proposed inverter apparatus and control method thereof can be used in a variety of power conversion schemes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inverter apparatus, comprising:
 a direct current to direct current (DC/DC) converter, arranged for outputting a first DC power and a second DC power;
 a direct current to alternating current (DC/AC) converter, coupled to the DC/DC converter, the DC/AC converter arranged for receiving the first DC power;
 a primary-side control circuit, coupled to the DC/DC converter, the primary-side control circuit arranged for controlling an operation of the DC/DC converter;
 a secondary-side control circuit, coupled to the DC/DC converter and the DC/AC converter, the secondary-side control circuit arranged for receiving the second DC power, and controlling an operation of the DC/AC converter according to the second DC power; and
 a guard circuit, coupled to the DC/DC converter, the guard circuit arranged for detecting the first DC power and accordingly generating a protection signal to the primary-side control circuit;

wherein the primary-side control circuit further refers to the protection signal to control the operation of the DC/DC converter.

2. The inverter apparatus of claim 1, wherein when the guard circuit detects that an energy level of the first DC power is greater than a predetermined level, the primary-side control circuit turns off the DC/DC converter according to the protection signal.

3. The inverter apparatus of claim 1, wherein when the guard circuit detects that an energy level of the first DC power is less than a predetermined level, the primary-side control circuit turns on the DC/DC converter according to the protection signal.

4. The inverter apparatus of claim 1, wherein the guard circuit comprises:
   an overvoltage protection circuit, arranged for comparing a voltage level of the first DC power with a predetermined level to generate a comparison result; and
   a controller, coupled to the overvoltage protection circuit, the controller arranged for generating the protection signal according to the comparison result.

5. The inverter apparatus of claim 1, wherein the primary-side control circuit comprises:
   a primary-side auxiliary power source, arranged for providing a primary-side auxiliary power signal; and
   a primary-side driver circuit, coupled between the primary-side auxiliary power source and the DC/DC converter, the primary-side driver circuit arranged for receiving the primary-side auxiliary power signal and the protection signal, and accordingly driving the DC/DC converter.

6. The inverter apparatus of claim 1, wherein the secondary-side control circuit comprises:
   a secondary-side auxiliary power source, arranged for receiving the second DC power to generate a secondary-side auxiliary power signal; and
   a secondary-side driver circuit, coupled between the secondary-side auxiliary power source and the DC/AC converter, the secondary-side driver circuit arranged for driving the DC/AC converter according to the secondary-side auxiliary power signal.

7. The inverter apparatus of claim 1, wherein the DC/DC converter comprises:
   a transformer, having a primary side and a secondary side, the transformer arranged for performing voltage conversion on an electrical power received at the primary side, wherein the secondary side comprises a first winding and a second winding, the first DC power is outputted from the first winding, and the second DC power is outputted from the secondary winding.

8. A control method of an inverter apparatus, the inverter apparatus comprising a direct current to direct current (DC/DC) converter and a direct current to alternating current (DC/AC) converter, an output side of the DC/DC converter being coupled to an input side of the DC/AC converter, the control method comprising:
   outputting a first DC power and a second DC power from the output side of the DC/DC converter, wherein the first DC power is outputted to the input side of the DC/AC converter;
   receiving the second DC power, and controlling an operation of the DC/AC converter according to the second DC power;
   detecting the first DC power, and accordingly generating a protection signal; and
   controlling an operation of the DC/DC converter according to the protection signal.

9. The control method of claim 8, wherein when it is detected that an energy level of the first DC power is greater than a predetermined level, the step of controlling the operation of the DC/DC converter according to the protection signal comprises:
   turning off the DC/DC converter according to the protection signal.

10. The control method of claim 8, wherein when it is detected that an energy level of the first DC power is less than a predetermined level, the step of controlling the operation of the DC/DC converter according to the protection signal comprises:
    turning on the DC/DC converter according to the protection signal.

11. The control method of claim 8, wherein the step of detecting the first DC power and accordingly generating the protection signal comprises:
    comparing a voltage level of the first DC power with a predetermined level to generate a comparison result; and
    generating the protection signal according to the comparison result.

12. The control method of claim 8, wherein the DC/DC converter comprises a transformer, the transformer has a primary side and a secondary side, the transformer performs voltage conversion on an electrical power received at the primary side, and the step of outputting the first DC power and the second DC power from the output side of the DC/DC converter comprises:
    outputting the first DC power from a first winding of the secondary side; and
    outputting the second DC power from a second winding of the secondary side, wherein the second winding is different from the first winding.

* * * * *